United States Patent
Isomichi

(10) Patent No.: US 6,433,667 B1
(45) Date of Patent: Aug. 13, 2002

(54) CHARGE PREVENTING CIRCUIT FOR A PAGER

(75) Inventor: Yasuhiro Isomichi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/362,823

(22) Filed: Jul. 28, 1999

(30) Foreign Application Priority Data

Aug. 26, 1998 (JP) .......................................... 10-240511

(51) Int. Cl.⁷ ................................................. H04Q 1/00
(52) U.S. Cl. ........................ 340/7.2; 320/112; 320/114
(58) Field of Search .............................. 340/7.2, 7.28, 340/7.32, 7.37; 455/575, 572, 573; 320/112, 111, 113, 114, 115, 132, 134, 136, 103, 138

(56) References Cited

U.S. PATENT DOCUMENTS

| | | | | |
|---|---|---|---|---|
| 4,709,201 A | * | 11/1987 | Schaefer et al. | 320/112 |
| 5,036,532 A | * | 7/1991 | Metroka et al. | 455/566 |
| 5,115,182 A | * | 5/1992 | Ehmke et al. | 320/114 |
| 5,136,229 A | * | 8/1992 | Galvin | 320/112 |
| 5,177,426 A | * | 1/1993 | Nakanishi et al. | 320/114 |
| 5,519,303 A | * | 5/1996 | Goedken et al. | 320/35 |
| 5,696,497 A | * | 12/1997 | Mottier et al. | 340/7.2 |
| 5,754,962 A | * | 5/1998 | Griffin | 455/569 |
| 5,793,186 A | * | 8/1998 | Watabe et al. | 320/112 |
| 5,847,542 A | * | 12/1998 | Ichihara | 320/119 |
| 5,870,615 A | * | 2/1999 | Bar-On et al. | 395/750.2 |
| 5,920,181 A | * | 7/1999 | Alberkrack et al. | 320/146 |
| 5,925,942 A | * | 7/1999 | Theobald | 307/125 |
| 6,157,316 A | * | 12/2000 | Okayama et al. | 340/7.2 |
| 6,167,289 A | * | 12/2000 | Ball et al. | 455/572 |
| 6,194,869 B1 | * | 2/2001 | Peterzell | 320/134 |
| 6,212,403 B1 | * | 4/2001 | Ushiroda | 455/557 |
| 6,212,410 B1 | * | 4/2001 | Ishida | 455/572 |

\* cited by examiner

*Primary Examiner*—Dwayne Bost
*Assistant Examiner*—Joy K. Contee
(74) *Attorney, Agent, or Firm*—Pearne & Gordon LLP

(57) ABSTRACT

In a pager, two battery negative terminals are provided which are connected to an air battery (1). One (1b) of the battery negative terminals is connected to ground (GND), while the other (1c) is connected through a resistor (6) to the external power source positive terminal of an external terminal (3). When the air battery (1) is mounted thereon, the battery negative terminals (1b and 1c) are electrically connected to each other (short-circuiting). In this case, even if the external power source is applied through the external terminal (3) with the air battery (1) mounted thereon, the current of the external power source flows through the resistor (6) to the ground (GND). This feature prevents the air battery (1) from being charged by the external power source.

18 Claims, 3 Drawing Sheets

| SIMULTANEOUS-USE DETECTION<br>EXTERNAL P/S DETECTION | "L" | "H" |
|---|---|---|
| "L" | ONLY EXTERNAL P/S | BOTH OF EXTERNAL P/S AND PRIMARY BATTERY |
| "H" | — | NO EXTERNAL P/S |

CHARGE PREVENTING CIRCUIT FOR A PAGER

BACKGROUND OF THE INVENTION

This invention relates to pagers, and more particularly to a pager which selectively uses a built-in primary battery as the power source of the receiver, or an external power source.

In a radio-call service using a pager, because of the provision of a FLEX-TD system the amount of information has increased, and the service has become diversified.

An example thereof is an information service. A pager is fundamentally used for a private calling service; however, the information service etc. are not limited thereto or thereby. The information service is such that the radio-call service provider and the content provider cooperate with each other, and the property of simultaneous transmission of the pager is utilized to transmit various news to a unspecified users. In order to transmit news to a number of persons, there is available a pager with an external output terminal which has a function of displaying on an electrical display board the news which are received by the pager.

FIG. 6 shows an example of the arrangement of a power source circuit for a conventional pager with an external output terminal. In FIG. 6, reference numeral 10 designates an air battery, which is employed as a power source built in the pager. Reference numeral 102 designates a DC/DC converter which forms a system voltage for the pager. Reference numeral 103 designates an external terminal, which is used for connection of external equipment. The external terminal 103 includes an input/output terminal and a power source terminal which is connected to an external power source. Reference numeral 104 designates a voltage conversion circuit, which functions to decrease the voltage obtained through the power source terminal of the external terminal 103 to a battery voltage. The voltage conversion circuit 104 comprises a regulator (REG) 104a for forming a constant voltage, and a reverse current preventing diode 104b.

The pager uses as its power source either the air battery 101 built therein or the external power source connected to the external terminal 103.

However, it is impossible for the pager to use both of the air battery and the external power source at the same time. This is because, if the air battery and the external power source are used at the same time, the voltage provided by the voltage conversion circuit 104 is applied to the primary battery, namely, the air battery 101, to charge the primary battery, which may break the latter. In order to prevent the primary battery from being charged, a method may be employed in which a reverse current preventing diode is coupled to the primary battery. However, the method is not practical because it results in a voltage loss. Accordingly, in the case where the above-described conventional pager uses the air battery, it is necessary to electrically disconnect the voltage conversion circuit 104 from the external terminal 103, or to insert a resistor to prevent the use of the current of the external power source. In addition, in the case where the external power source is used, it is necessary to structurally inhibit the insertion of the air battery.

As is apparent from the above description, for the conventional pager there is no means for avoiding the problem (difficulty) that, in the case where the pager uses the primary battery and the external power source at the same time, the primary battery is charged. Hence, the user must pay attention to the operation of the pager, and the latter is unavoidably intricate in structure. Even if it is tried to provide common parts or common structures, it is necessary to prepare special parts for the power source section. This means that the manufacture of the pager is low in manufacture control efficiency.

SUMMARY OF THE INVENTION

Accordingly, an object of the invention is to eliminate the above-described difficulties accompanying a conventional pager.

More specifically, an object of the invention is to provide a pager in which, even when the primary battery and the external power source are used at the same time, the primary battery is not charged, so that it is high in safety, and the occurrence of troubles is prevented during use.

Another object of the invention is to provide a pager which is high in manufacture efficiency with the parts and structure being simplified irrespective of the purposes of use thereof.

The foregoing objects of the invention have been achieved by the provision of a pager comprising first power source means in which a primary battery is employed as a power source, and second power source means in which an external power source supplied from outside is employed as a power source, which comprises: charge preventing means which, when the first and second power source means are used at the same time, prevents the primary battery in the first power source means from being charged by the external power source in the second power source means.

With the pager, the difficulty is eliminated that, when the primary battery and the external power source are used at the same time, erroneously the primary battery is charged.

In the pager, the first power source has a first positive terminal and a first negative terminal which are connected both terminals of the primary battery, and a battery detecting terminal which, when the primary battery is mounted on the pager, is electrically connected to the first negative terminal, and when the primary battery is not mounted on the pager, is electrically disconnected from the first negative terminal, and the second power source has an external terminal which has at least a second positive terminal and a second negative terminal which are connected to the external power source, the second positive terminal being connected through a resistor to the battery detecting terminal.

With the pager, in the case where the primary battery and the external power source are used at the same time, the second positive terminal is connected through the resistor to the battery detecting terminal and the first negative terminal. This feature prevents the current of the external power source from flowing to the power source path of the primary battery.

The above-described pager comprises external power source detecting means for detecting the fact that the power of the power source is applied to the second power source means.

With the pager, the fact is detected that the power source is connected, and its power is applied to the second power source means.

Furthermore, the pager comprises simultaneous-use detecting means for detecting the fact that the first and second power source means are used at the same time.

With the pager, the fact is detected that the power source of the built-in primary battery and the external power source connected to the external terminal are used at the same time.

In addition, the pager comprises alarming means which, when the simultaneous-use detecting means detects the fact that the first and second power source means are used at the same time, outputs a warning signal for a user.

With the pager, for instance when the built-in primary power source and the external power source are used at the same time, the user can detect the state of use of the power source with ease.

DETAILED DESCRIPTION OF THE PREFERRED EMBODIMENTS

Figure 1:
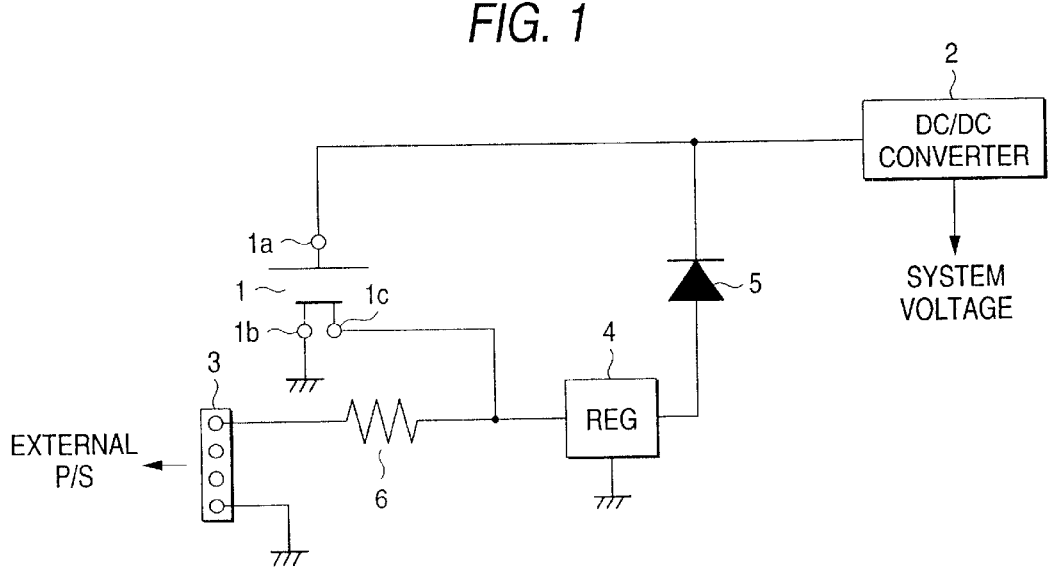
FIG. 1 is a circuit diagram showing the arrangement of a power source section in an example of a pager, which constitutes a first embodiment of the invention.

Preferred embodiments of the invention will be described with reference to the accompanying drawings.

First Embodiment

As was described above, FIG. 1 shows the pager, the first embodiment of the invention.

The pager has a primary battery, namely, an air battery 1 which is employed as a built-in power source. A battery mounting section, where the air battery 1 is mounted, has power source terminals connected to the terminals of the air battery 1. More specifically, provided at the battery mounting section are a first positive terminal, namely, a battery positive terminal 1a, a first negative terminal, namely, a battery negative terminal 1b, and a battery detecting terminal, namely, the other battery negative terminal. The battery positive terminal 1a is connected to a DC/DC converter 2 which forms a system voltage for the pager.

The pager has an external terminal 3 comprising connectors which are connected to external equipment, an external power source, etc. More specifically, the external terminal 3 comprises: a second positive terminal, namely, an external power source positive terminal; a second negative terminal, namely, an external power source negative terminal; and a data input/output terminal. The external power source positive terminal of the external terminal 3 is connected to a resistor 6; that is, it is connected through the resistor 6 to the input terminal of a regulator (REG) 4. The regulator 4 is constant voltage forming means for converting a voltage which is obtained from the external power source through the external terminal 3 into a battery voltage. The external power source positive terminal of the external terminal 3 is connected through the resistor 6 to the battery negative terminal 1c which is the battery detecting terminal.

The output terminal of the regulator 4 is connected through a reverse current preventing diode 5 to the DC/DC converter 2. The diode 5 is to eliminate the difficulty that, when the air battery 1 is coupled to the pager, current flows to the regulator 4 in the reverse direction to break the regulator 4. The resistor 6 is to limit the amount of current from the external power source, and its resistance is adjusted to a value which is greater than the maximum value of a pager operating current.

Now, the operation of the first embodiment will be described.

When, in the circuit of the FIG. 1, the air battery 1 is mounted; that is, only the air battery 1 is used as a power source, with the aid of the DC/DC converter the pager system voltage is formed from the battery voltage. In the case where the external power source is connected to the external terminal 3; that is, only the external power source is used as a power source, the external power source voltage is decreased to the battery voltage with the aid of the regulator, and then the system voltage is formed with the aid of the DC/DC converter 2.

In the case where the air battery 1 and the external power source are used as power source at the same time, the two battery negative terminals 1b and 1c, which are provided at the battery mounting section, are short-circuited through the negative terminal (surface) of the air battery 1, and therefore the input terminal of the regulator is grounded (being connected to the ground (GND)). Hence, a voltage is not sufficiently applied to the regulator 4, so that no current from the external power source flows to the power source line of the positive terminal of the air battery 1; that is, only current from the air battery 1 flows. This feature prevents the air battery 1 from being charged. In this case, the DC/DC converter uses the power of the air battery to form the system voltage. In addition, the current of the external power source is limited by the resistor 6. This feature prevents the external power source from being short-circuited or overloaded.

With the pager thus designed, the difficulty is overcome that, when the primary battery and the external power source are used at the same time, erroneously the primary battery is charged; that is, the trouble is eliminated which otherwise may be involved during the use of the power source. In this case, one kind of construction meets various specifications (various purposes of use) such as a specification that both the battery and the external power source are used, a specification that only the battery is used, and a specification that only the external power source is used. Therefore, irrespective of the purposes of use, common parts and common structures can be employed. Hence, during manufacture of the pager, its parts and manufacturing steps can be controlled with high efficiency.

In the above-described embodiment, the two battery negative terminals 1b and 1c (which are connected to the air battery 1) are, when the battery is mounted, electrically connected to each other through the negative terminal surface of the batter; however, it may be so designed that, when the battery is mounted, the two negative terminals are directly brought into contact with each other. Furthermore, in the embodiment, the means for adjusting the voltage of the external power source to the battery voltage includes the regulator 4 and the diode 5. However, diodes may be arranged to decrease the voltage; and the diode 5 may be omitted if the regulator 4 may not be broken. In addition, a resistor may be inserted between the input terminal of the regulator and the battery negative terminal 1c so that, when the sources are used at the same time, the current from the external power source is decreased. In this case, it is necessary that the input voltage of the regulator 4 is adjusted to the level with which the output of the regulator 4 cannot be obtained. Furthermore, smoothing capacitors or electrostatic-trouble avoiding diodes may be inserted in the power source lines.

Second Embodiment

Another example of the pager, a second embodiment of the invention, will be described with reference to FIG. 2.

Figure 2:
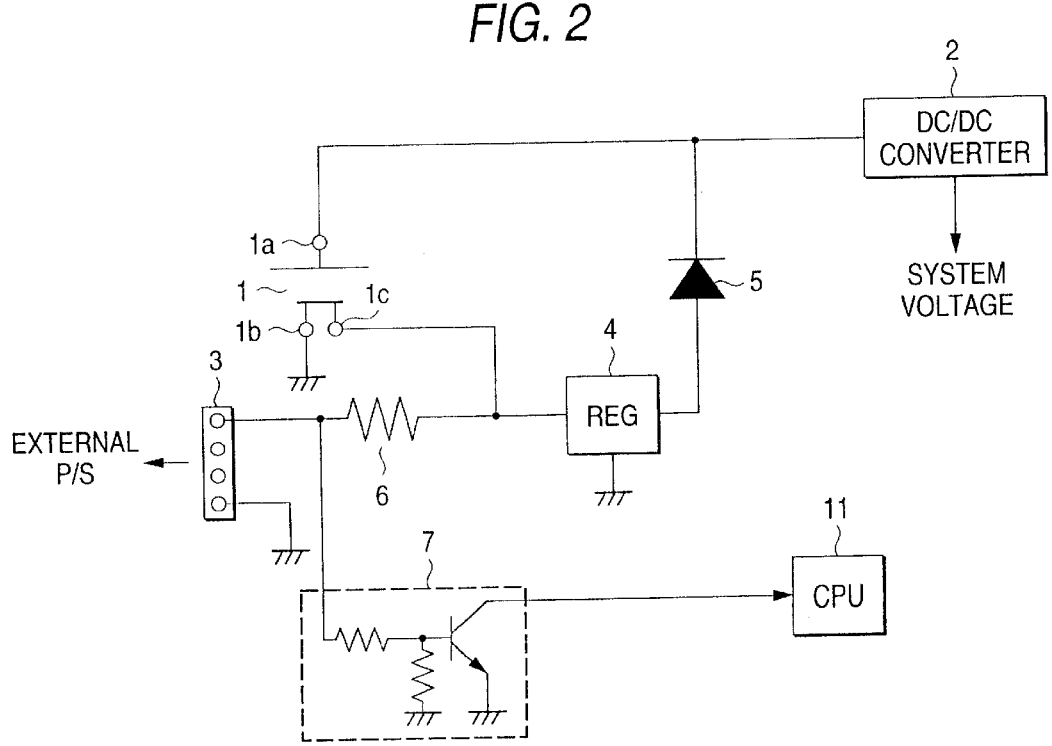
FIG. 2 is a circuit diagram showing the arrangement of a power source section in another example of the pager, which constitutes a second embodiment of the invention.

In FIG. 2, parts corresponding functionally to those already described with reference to FIG. 1 are therefore designated by the same reference numerals or characters (1 through 6). In the second embodiment, external power source detecting means, namely, an external power source detecting section 7 is provided, and its input terminal is connected to the connecting point of the resistor 6 and the positive terminal of the external terminal 3. The external power source detecting section 7 is, for instance, made up of an npn-type transistor, whose collector output is connected to a CPU 11.

The operation of the second embodiment will be described.

In the case where the external power source is not used, the input level of the base of the transistor in the external power source detecting section 7 is at "L" level, while the output level of the collector thereof is at "H" level. In the case where the external power source is connected to the external terminal 3, the input level of the external power source detecting section 7 is at "H" level, while the output level thereof is at "L" level. With the CPU 11, when the output level of the external power source detecting section 7 is at "H" level, it can be determined that the external power source is not used; and when the output level is at "L" level, it can be determined that the external power source is used.

The pager being designed as described above, it can be determined whether or not the external power source is used. Hence, the CPU 11 is able to perform processes according to states of the pager; more specifically, it is able to display, for instance, kinds of power sources with light means or to indicate them as image displays, or to indicate them by utilizing sounds or by operating a buzzer.

Third Embodiment

Figures 3, 4:
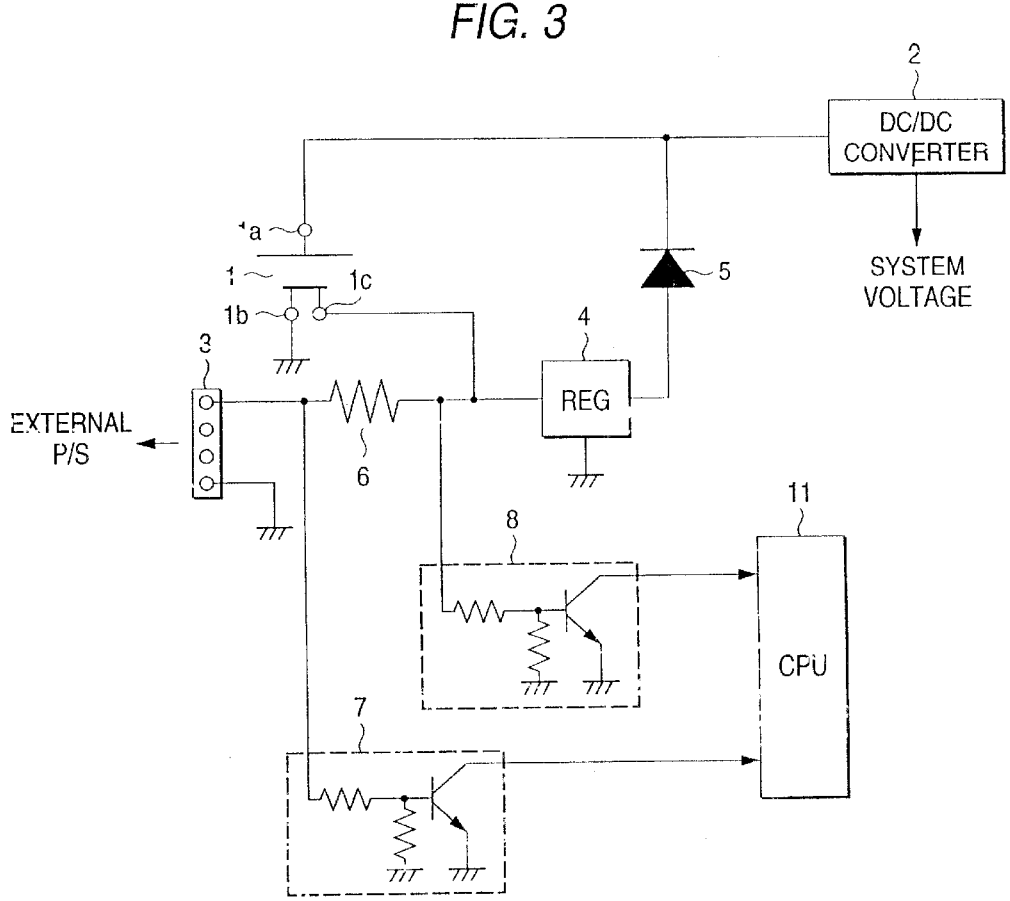
FIG. 3 is a circuit diagram showing the arrangement of a power source section in another example of the pager, which constitutes a third embodiment of the invention.
FIG. 4 is a matrix diagram showing operations according to states of use of power sources of the pager shown in FIG. 3.

FIG. 3 is a circuit diagram showing the arrangement of the power source section in another example of the pager, which constitutes a third embodiment of the invention. And FIG. 4 is a matrix diagram showing operations according to the states of use of the power sources in the pager shown in FIG. 3.

In FIG. 3, reference numerals 1 through 7 designate the same parts as those in FIG. 2. In the third embodiment, simultaneous use detecting means, namely, a simultaneous use detecting section 8 is provided, and its input terminal is connected to the connecting point of the resistor 6 and the input terminal of the regulator. The simultaneous use detecting section is made up of an npn-type transistor, whose connector output is connected to a CPU 11.

The operation of the third embodiment will be described.

In the case where the external power source is connected to the external terminal 3, the output level of the external power source detecting section 7 is at "L" level. In the case where, under this condition, the air battery 1 is not coupled thereto, the input level of the base of the transistor 8 in the simultaneous use detecting section 8 is at "H" level, while the output level of the collector thereof is at "L" level. When the air battery 1 is coupled thereto, the input level of the simultaneous use detecting section 8 is set to "L" level, while the output level thereof is raised to "H" level.

On the other hand, in the case where the external power source is not used, the output level of the external power source detecting section 7 is at "H" level, and the output level of the simultaneous use detecting section 8 is at "H" level irrespective of the presence or absence of the air battery 1.

If summarized, the operations of the external power source detecting section 7 and the simultaneous use detecting section 8 according to the states of use of the power sources are as indicated in FIG. 4. According to the four decision logics indicated in the operation table of FIG. 4, the CPU 11 determines the fact that, when the output level of the external power source detecting means 7 is at "L", and the output level of the simultaneous use detecting means 8 is at "H", the external power source and the air battery are used at the same time.

The third embodiment is so designed that it can be determined whether or not the primary battery and the external power source are used at the same time. Therefore, the CPU 11 is able to perform processes according to the states of the pager; more specifically, it is able to display, for instance, kinds of power sources with light means or to indicate them as image displays, or indicate them by utilizing sounds or by operating a buzzer.

Fourth Embodiment

Figure 5:
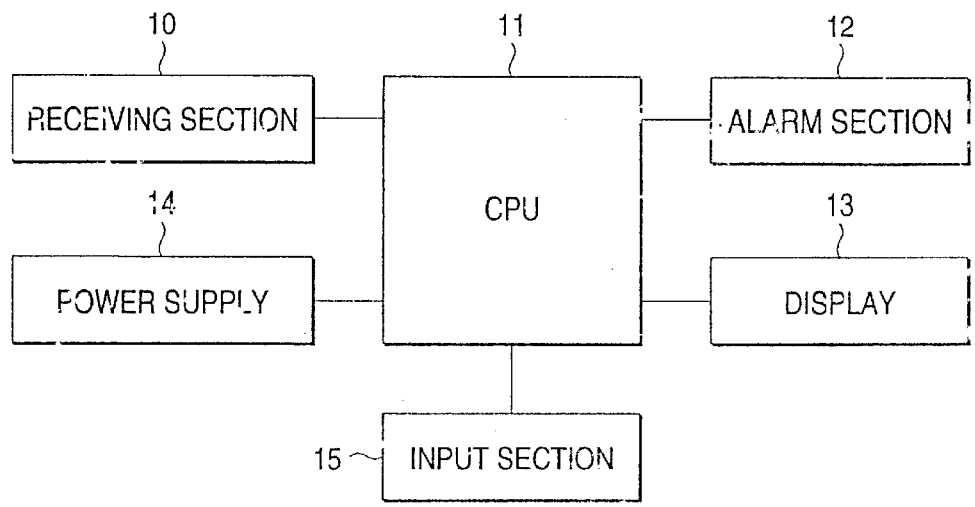
FIG. 5 is a block diagram showing the arrangement of a power source section in another example of the pager, which constitutes a fourth embodiment of the invention.
Figure 6:
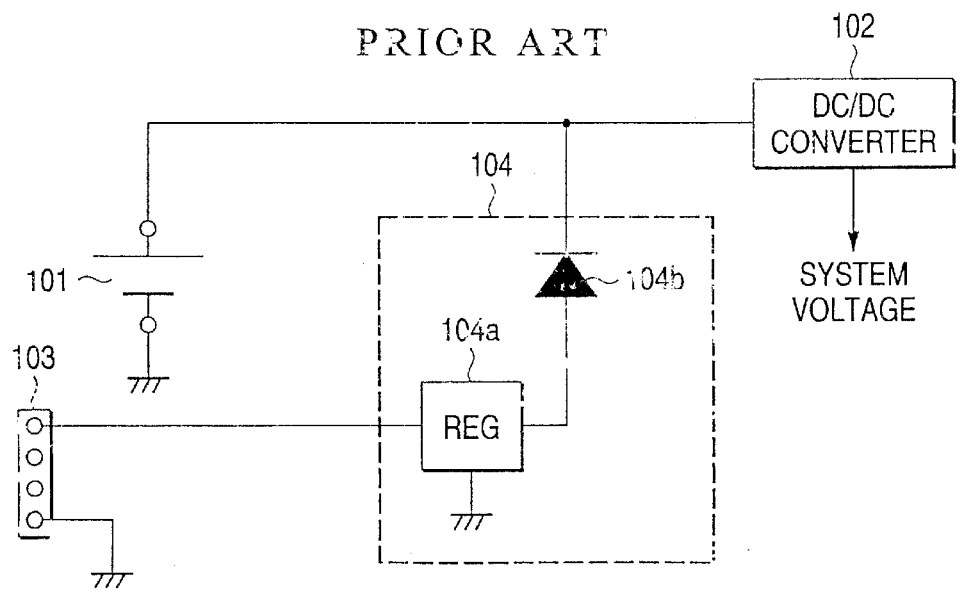
FIG. 6 is a circuit diagram showing an example of the arrangement of a power source circuit of a conventional pager.

FIG. 5 is a block diagram showing the arrangement of another example of the pager, which constitutes a fourth embodiment of the invention.

The pager, the fourth embodiment of the invention, comprises a receiving section 10, a CPU 11, an alarming (informing) section 12, a display section 13, a power source section 14, and an input section 15. The receiving section 10 has a circuit which demodulates a received radio wave to obtain a message. The CPU 11 operates as follows: When the message obtained by the receiving section 10 is for the CPU 11, the latter 11 operates the alarming section 12; more specifically, it operates a buzzer or LED forming the alarming section 12 to indicate the arrival of the message. Furthermore, the CPU 11 operates the display section 13 to display the received message, for instance, on an LCD screen. The alarming section 12, and the display section form alarming means. The power source section 14 is equal to the power source circuit (FIG. 3) of the third embodiment. The input section 15 is, for instance, made up of a push-switch so that the user performs the operation input.

The operation of the fourth embodiment of the invention will be described.

In the case where the external power source and the air battery are used at the same time, the using of them is detected by the power source section 14 and is informed to the CPU 11. The CPU 11 uses the alarming section 12 to output a warning sound, or uses the display section 13 to display, for instance "When the external power source is used, remove the battery".

Since the fourth embodiment is designed as described above, the user is able to know the fact that the primary battery and the external power source are used at the same time. Therefore, in this case, for instance, the user may remove the battery; that is, the difficulty accompanying the simultaneous use of the power sources can be eliminated.

In the fourth embodiment, in the case where the primary battery and the external power source are used at the same time, the warning sound is outputted while the display is made. However, the embodiment may be so modified (simplified) that only the warning sound is outputted, or only the display is made. In addition, other alarming means (such as a vibrator) maybe employed if the user is able to detect it.

As was described above, the pager of the invention has the charge preventing means which, when the first power source means having the primary battery as its power source, and the second power source means having the external power source as its power source are used at the same time, prevents the primary battery of the first power source means from being charged by the external power source of the second power source means. Hence, even in the case where the primary battery and the external power source are used at the same time, the primary battery is not charged by the external power source. This feature prevents the occurrence of troubles during use; that is, the pager of the invention is high in safety.

Furthermore, the pager has the external power source detecting means with which it can be detected which of the power sources is being used. Hence, the employment of the CPU or the like makes it possible to perform processes according to the states of use of the power sources. In addition, the simultaneous-use detecting means can detect the fact that the power sources are used at the same time. Hence, when the power sources are used at the same time, the warning signal is transmitted to the user with the aid of the alarming means.

It is possible for the manufacturer to employ the same construction irrespective of the kinds of power sources; more specifically, common parts and structures can be employed irrespective of the purposes of use. That is, the pager can be manufactured with high efficiency.

What is claimed is:

1. A pager comprising:
   first power source means in which a primary battery is employed as a power source;
   second power source means in which an external power source supplied from outside is employed as a power source; and
   charge preventing means which, when said first and said second power source means are connected at the same time, both prevents said primary battery in said first power source means from being charged by said external power source in said second power source means and allows said first power source means to supply power to said pager.

2. A pager comprising:
   first power source means in which a primary battery is employed as a power source; wherein said first power source includes:
   a first positive terminal connected to said primary battery;
   a first negative terminal connected to said primary battery; and
   a battery detecting terminal which, when said primary battery is mounted on said pager, is electrically connected to said first negative terminal, and when said primary battery is not mounted on said pager, is electrically disconnected from said first negative terminal;
   second power source means in which an external power source supplied from outside is employed as a power source, wherein said second power source includes an external terminal which has a second positive terminal and a second negative terminal which are connected to said external power source, wherein said second positive terminal is connected through a resistor to said battery detecting terminal; and
   charge preventing means which, when said first and said second power source means are connected at the same time, prevents said primary battery in said first power source means from being charged by said external power source in said second power source means.

3. A pager as claimed in claim 1 or 2, further comprising external power source detecting means for detecting the fact that power source is applied to said second power source means.

4. A pager as claimed in claims 1 or 2, further comprising: simultaneous-use detecting means for detecting the fact that said first and second power source means are used at the same time.

5. A pager as claimed in claim 4, further comprising: alarming means which, when said simultaneous-use detecting means detects the fact that said first an d second power source means are used at the same time, outputs a warning signal for a user.

6. A pager as claimed in claim 1, further comprising:
   external power source detecting means for detecting the fact that power source is applied to said second power source means; and
   simultaneous-use detecting means for detecting the fact that said first and second power source means are used at the same time.

7. A pager as claimed in claim 6, further comprising: alarming means which, when said simultaneous-use detecting means detects the fact that said first and second power source means are used at the same time, outputs a warning signal for a user.

8. An electronic device comprising:
   first power source means in which a primary battery is employed as a power source;
   second power source means in which an external power source supplied from outside is employed as a power source; and
   charge preventing means which, when said first and said second power source means are connected at the same time, both prevents said primary battery in said first power source means from being charged by said external power source in said second power source means and allows said first power source means to supply power to said electronic device.

9. An electronic device comprising:
   first power source means in which a primary battery is employed as a power source; wherein said first power source includes:
   a first positive terminal connected to said primary battery;
   a first negative terminal connected to said primary battery; and
   a battery detecting terminal which, when said primary battery is mounted on said pager, is electrically connected to said first negative terminal, and when said primary battery is not mounted on said electronic device, is electrically disconnected from said first negative terminal;
   second power source means in which an external power source supplied from outside is employed as a power source, wherein said second power source includes an external terminal which has a second positive terminal and a second negative terminal which are connected to said external power source, wherein said second positive terminal is connected through a resistor to said battery detecting terminal; and charge preventing means which, when said first and said second power source means are connected at the same time, prevents said primary battery in said first power source means from being charged by said external power source in said second power source means.

10. An electronic device as claimed in claim 8 or 9, further comprising external power source detecting means for detecting the fact that power source is applied to said second power source means.

11. An electronic device as claimed in claims 8 or 9, further comprising: simultaneous-use detecting means for detecting the fact that said first and second power source means are used at the same time.

12. An electronic device as claimed in claim 11, further comprising: alarming means which, when said simultaneous-use detecting means detects the fact that said first and second power source means are used at the same time, outputs a warning signal for a user.

13. A pager as claimed in claim 8, further comprising:
external power source detecting means for detecting the fact that power source is applied to said second power source means; and
simultaneous-use detecting means for detecting the fact that said first and second power source means are used at the same time.

14. A pager as claimed in claim 13, further comprising: alarming means which, when said simultaneous-use detecting means detects the fact that said first and second power source means are used at the same time, outputs a warning signal for a user.

15. A pager as claimed in claim 2, further comprising:
external power supply source detecting means for detecting the fact that a power source is applied to said second power source means; and
simultaneous-use detecting means for detecting the fact that said first and said second power source means are connected at the same time.

16. An electronic device as claimed in claim 9, further comprising:
external power supply source detecting means for detecting the fact that a power source is applied to said second power source means; and
simultaneous-use detecting means for detecting the fact that said first and said second power source means are connected at the same time.

17. An electronic device comprising:
a first power source including:
a primary battery, wherein said primary battery can be removed from said electronic device;
a first positive terminal connected to a positive terminal of primary battery;
a first negative terminal connected to a negative terminal of said primary battery;
a battery detecting terminal connected to said first negative terminal when said primary battery is present and disconnected from said first negative terminal when said primary battery is not present;
a second power source including:
an external power supply;
a second positive terminal for connecting to a positive terminal of said external power supply; and
a second negative terminal for connecting to a negative terminal of said external power supply; and
charge preventing means which, whenever said battery detecting terminal is connected, prevents said external power supply from charging said primary battery and prevents said external power supply from powering the electronic device and also allows said primary battery to power the electronic device, but which allows said external power supply to power the electronic device when said battery detecting terminal is disconnected.

18. A pager comprising:
a first power source including:
a primary battery, wherein said primary battery can be removed from said pager;
a first positive terminal connected to a positive terminal of primary battery;
a first negative terminal connected to a negative terminal of said primary battery;
a battery detecting terminal connected to said first negative terminal when said primary battery is present and disconnected from said first negative terminal when said primary battery is not present; a second power source including:
an external power supply;
a second positive terminal for connecting to a positive terminal of said external power supply; and
a second negative terminal for connecting to a negative terminal of said external power supply; and
charge preventing means which, whenever said battery detecting terminal is connected, prevents said external power supply from charging said primary battery and prevents said external power supply from powering the pager and also allows said primary battery to power the pager, but which allows said external power supply to power the pager when said battery detecting terminal is disconnected.

* * * * *